W. F. EVANS.
NUT LOCK.
APPLICATION FILED MAR. 28, 1919.
1,341,741.
Patented June 1, 1920.
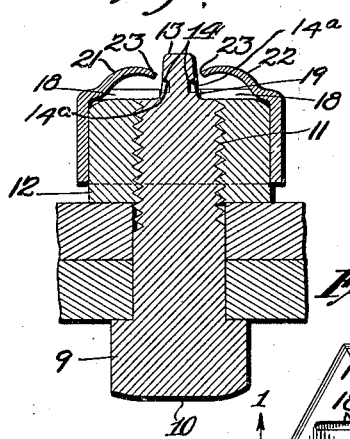
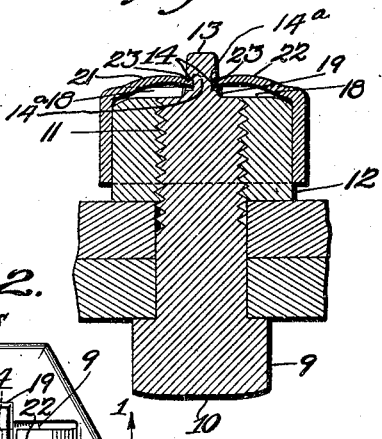
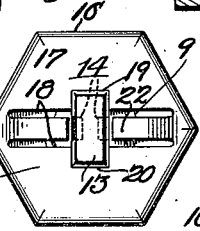
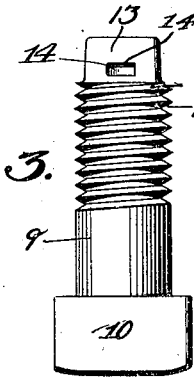
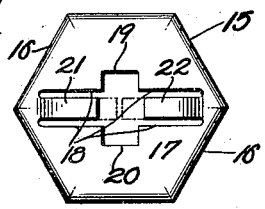
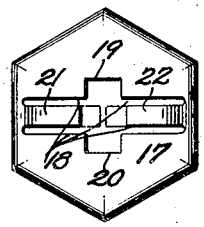
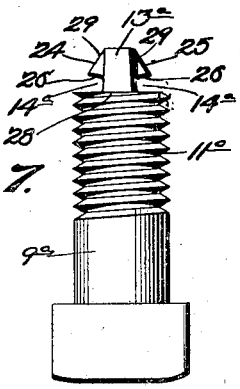
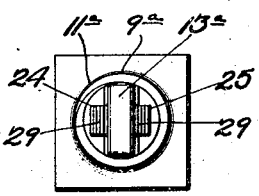
Witnesses
Horace D. Harwood
Augustus B. Copper
Inventor
William F. Evans.
By Joshua R. H. Potts
his Attorney

UNITED STATES PATENT OFFICE.

WILLIAM F. EVANS, OF PHILADELPHIA, PENNSYLVANIA, ASSIGNOR OF ONE-NINTH TO GEORGE D. CARNEY, OF CHESTER, PENNSYLVANIA, AND ONE-NINTH TO NICOLO FIOLIOLO, OF NEW YORK, N. Y., AND ONE-NINTH TO E. J. ARGHIS, OF BROOKLYN, NEW YORK.

NUT-LOCK.

1,341,741.  Specification of Letters Patent.  Patented June 1, 1920.

Application filed March 28, 1919. Serial No. 285,788.

*To all whom it may concern:*

Be it known that I, WILLIAM FRANKLIN EVANS, a citizen of the United States, residing at Philadelphia, in the county of Philadelphia and State of Pennsylvania, have invented certain new and useful Improvements in Nut-Locks, of which the following is a specification.

One object of my invention is to provide locking means of a simple and durable construction which will prevent nuts from accidentally becoming loose upon bolts or becoming entirely detached therefrom.

Another object is to so construct my invention that it can be quickly and easily operated to lock a nut upon a bolt and can also be quickly released from said bolt.

Another object is to so construct my improved locking means that it can be manufactured at a low cost and for this reason can be practically used in great numbers upon machinery, railroad construction or for numerous other purposes.

These objects, and other advantageous ends which will be described hereinafter, I attain in the following manner, reference being had to the accompanying drawings in which—

Figure 1 is a sectional view taken on the line 1—1 of Fig. 2 and showing my invention in connection with a nut upon a bolt before the same is locked, Fig. 2 is a top plan view of Fig. 1, Fig. 3 is an elevation of a bolt constructed in accordance with my invention and which has a portion forming one of the locking parts of my invention, Fig. 4 is a top plan view of a locking cap which is adapted to fit over the nut and which is made in accordance with my invention, Fig. 5 is a view of similar nature to Fig. 1 showing the parts in a position locking the nut to the bolt, Fig. 6 is a view of similar nature to Fig. 4 with the exception that certain of the parts are located in a different position, Fig. 7 is a view of a bolt having a locking portion made in a slightly different manner from that shown in Fig. 3, and Fig. 8 is a top plan view of Fig. 7.

Referring to Figs. 1 to 6 inclusive of the drawings, 9 represents a bolt having a head 10 and a screw threaded portion 11 upon which is screwed an ordinary hexagonal nut 12. The free end of the bolt 9 is made elongated in cross section, as shown at 13. This end portion at opposite faces has depressions or cavities 14 providing shoulders $14^a$ extending transversely to the length of the bolt. A hollow metallic cap 15 has sides which are angularly disposed to each other in hexagonal formation and adapted to fit against the sides of the nut 12 so as to prevent relative rotation between the nut 12 and the cap 15 when the latter is in place, such for example as shown in Fig. 1. The cap is preferably made of pressed sheet malleable metal and has a top 17 provided with a slot 18. The slot 18 includes two lateral notches 19 and 20 which are oppositely disposed and are of such size as to permit the end portion 13 to project therethrough, as clearly shown in Figs. 1 and 2. The end portion 13 substantially fills the notches 19 and 20 and therefore relative rotation between the cap 15 and the bolt 9 is prevented. The top 17 can be punched to produce the slot 18 and by thus punching said slot two tongues 21 and 22 are formed, such for example as shown in Fig. 4. These tongues 21 and 22 are of such length that if they were flattened out in the plane of the top 17 they would extend beyond the sides of the end portion 13 of the bolt 9, such for example as shown in dot and dash lines in Fig. 4. For the purpose of my invention, however, these tongues 21 and 22 are curved upwardly above the plane of the top 17 so that the free ends 23 are normally spaced apart a greater distance than the thickness of the end 13 of the bolt 9, as clearly shown in Fig. 1. It will be noted, however, that while the tongues 21 and 22 are upwardly curved that the ends 23 of the tongues extend downwardly in a direction of the cavities 14. To lock the cap 15 upon the bolt 9 it is merely necessary to strike the tongues 21 and 22 so as to bend them toward the nut 12 and in so doing said tongues 21 and 22 will tend to straighten out and cause the ends 23 to project into the cavities 14. When the ends 23 are thus forced within the cavities 14, such for example as shown in Fig. 5, it is impossible for the cap 15 to slip from the nut 12 and since the cap 12 is locked against rotation relatively to the nut 12 and bolt 9, the nut 12 will be firmly locked to the bolt 9.

The cap shown in Fig. 6 is similar in all respects to the cap shown in Figs. 1, 2, 4 and 5 with the exception that instead of having the slot 18 extend directly from the corners, or in other words, in the direction of the diagonal, the slots shown in Fig. 6 extend at right angles to the sides 16. Therefore, since it is merely a different disposition of the slot, I have given similar parts in Fig. 6 the same reference numerals as are used in connection to Figs. 1 to 5 inclusive.

In Figs. 7 and 8, I have illustrated a modified form of bolt from that described in connection with Figs. 1 to 6 inclusive. Referring to Figs. 7 and 8, the bolt $9^a$ has its end portion $13^a$ provided with two oppositely disposed lugs 24 and 25. These lugs at their bottoms provide shoulders 26 and the space between the shoulders 26 and the top surface 28 of the screw threaded portion $11^a$ provides cavities $14^a$ into which the ends 23 of the tongues 21 and 22 can be forced; the lugs 25 fitting within the slot 18. The end portion $13^a$ will fit within the notches 19 and 20 in the same manner as above described in connection with the end portion 13 of the bolt 9. The lugs 24 and 25 preferably have their upper surface beveled, as shown at 29 so as to facilitate the attachment of the cap, since the bevel surface 29 will serve as means for moving the ends 23 of the tongues 21 and 22 out of the way in case said tongues should happen to be of such length as to interfere with the free attachment of the cap to the nut 12.

The tongues 21 and 22 are of such length that when they are forced into the cavities 14 they will still remain slightly bowed so that they can be quickly detached by inserting a small tool, such for example as a screw driver or the like, between the top and the inner surface of the tongues so that the cap can be quickly detached to unlock the nut from the bolt.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A nut lock including a bolt upon which the nut is screwed, said bolt having a cavity providing a shoulder extending transversely to the length of the bolt; a cap having portions fitting said nut whereby relative rotation between the nut and the cap is prevented, said cap having a notch therein into which an angular portion of said bolt extends; and a tongue on said cap adapted to be forced into said cavity in the bolt; substantially as described.

2. A nut lock including a bolt upon which the nut is screwed, said bolt having a cavity providing a shoulder extending transversely to the length of the bolt; a cap having portions fitting said nut whereby relative rotation between the nut and the cap is prevented, said cap having a notch therein into which an angular portion of said bolt extends; and a tongue on said cap adapted to be forced into said cavity in the bolt, said tongue being normally curved upwardly and having its free end portion extending in the direction of said cavity whereby when said tongue is moved toward said nut, the end of said tongue will project into said cavity; substantially as described.

3. A nut lock including a bolt having a nut screwed thereon, said bolt having a projecting portion which is elongated in cross section and provided with a cavity providing a shoulder extending transversely to the length of the bolt; and a cap fitting said nut and having a notch in its top through which said projecting portion of the bolt extends, said cap having a tongue normally bent above the plane of the top of the cap and of such length that when it is moved toward said nut that said tongue will become elongated and project into said cavity; substantially as described.

4. A nut lock including a bolt having a nut screwed thereon, said bolt having a projecting end portion elongated in cross section and having cavities formed in its opposite sides; and a cap fitting said nut and having a slot in its top including oppositely disposed lateral notches through which said projecting portion of the bolt extends, said cap including two tongues in alinement with said slot, said tongues being normally bent beyond the top of the cap, whereby when the tongues are moved toward the nut the end portions of said tongues will project into said cavities and thereby prevent the cap from slipping from the nut; substantially as described.

5. A nut lock including a bolt having a nut screwed thereon, said bolt having a projecting end portion elongated in cross section and having cavities formed in its opposite sides; and a cap fitting said nut and having a slot in its top including oppositely disposed lateral notches through which said projecting portion of the bolt extends, said cap including two tongues in alinement with said slot, said tongues being normally bent beyond the top of the cap, whereby when the tongues are moved toward the nut the end portions of said tongues will project into said cavities and thereby prevent the cap from slipping from the nut, said tongues normally having their free end portions extending toward said cavities; substantially as described.

In testimony whereof I have signed my name to this specification in the presence of two subscribing witnesses.

WILLIAM F. EVANS.

Witnesses:
MARY A. INGLAR,
CHAS. E. POTTS.